(12) United States Patent
Zhou et al.

(10) Patent No.: US 11,036,741 B2
(45) Date of Patent: Jun. 15, 2021

(54) ASSOCIATION RULE MINING SYSTEM

(71) Applicant: International Business Machines Corporation, Armonk, NY (US)

(72) Inventors: Yan XA Zhou, Xi'an (CN); Xing Wei, Xi'an (CN); Si ER Han, Xi'an (CN); Xue Ying Zhang, Xi'an (CN); Wei Shan WS Kang, Xi'an (CN); Hua XA Li, Xi'an (CN)

(73) Assignee: International Business Machines Corporation, Armonk, NY (US)

(*) Notice: Subject to any disclaimer, the term of this patent is extended or adjusted under 35 U.S.C. 154(b) by 251 days.

(21) Appl. No.: 16/289,819

(22) Filed: Mar. 1, 2019

(65) Prior Publication Data

US 2020/0278972 A1    Sep. 3, 2020

(51) Int. Cl.
*G06F 16/00* (2019.01)
*G06F 16/2455* (2019.01)
(Continued)

(52) U.S. Cl.
CPC .... *G06F 16/24564* (2019.01); *G06F 16/1865* (2019.01); *G06F 16/2246* (2019.01); *G06F 16/2465* (2019.01)

(58) Field of Classification Search
CPC .......... G06F 16/24564; G06F 16/1865; G06F 16/2465; G06F 16/2246
See application file for complete search history.

(56) References Cited

U.S. PATENT DOCUMENTS 6,618,725 B1 * 9/2003 Fukuda ................. G06F 16/345
2011/0184922 A1  7/2011 Lee
(Continued)

FOREIGN PATENT DOCUMENTS

CN    101127037 A    2/2008
CN    101996102 A    3/2011
WO    WO2018072711 A1    4/2018

OTHER PUBLICATIONS

Gupta, Bharat, and Deepak Garg. "FP-Tree Based Algorithms Analysis: FPGrowth, COFI-Tree and CT-PRO." International Journal on Computer Science and Engineering 3.7 (2011): 2691-2699. (Year: 2011).*

(Continued)

*Primary Examiner* — Diedra McQuitery
(74) *Attorney, Agent, or Firm* — Yee & Associates, P.C.

(57) ABSTRACT

Identifying relations between items in transactions. Local conditional frequency pattern trees are generated in processing nodes in a computer system. The nodes in the local conditional frequency pattern trees represent items and a frequency of the items in the transactions. Global conditional frequency pattern trees are generated in the processing nodes. Each processing node in the processing nodes generates a global conditional frequency pattern tree using a set of local conditional frequency pattern trees in the processing node. The global conditional frequency pattern trees generated by the processing nodes are distributed such that each processing node in the processing nodes has the global conditional frequency pattern trees generated by other processing nodes. Patterns are generated by the computer system. A set of rules is generated using the patterns and the global conditional frequency pattern trees in the processing nodes, wherein the set of rules define the relations between the items.

20 Claims, 11 Drawing Sheets

(51) Int. Cl.
*G06F 16/18* (2019.01)
*G06F 16/2458* (2019.01)
*G06F 16/22* (2019.01)

(56) References Cited

U.S. PATENT DOCUMENTS

| | | | |
|---|---|---|---|
| 2016/0253366 A1 | 9/2016 | Hsu et al. | |
| 2018/0107695 A1* | 4/2018 | Yang | G06F 16/2282 |
| 2019/0362010 A1* | 11/2019 | Salomon | G06F 16/285 |
| 2019/0362016 A1* | 11/2019 | Xie | G06F 16/9024 |

OTHER PUBLICATIONS

Joshi, Apexa, and M. B. Suresh. "Compact structure of felonious crime sets using fp-tree comparable algorithms analysis." International Journal of Computer Science and Information Technologies 5 (2014): 2694-2699. (Year: 2014).*

Gupta, Bharat. A Better Approach to Mine Frequent Itemsets Using Apriori and FP-Tree Approach. Diss. Thapar University Patiala, 2011. (Year: 2011).*

Li et al., "Parallel Data Mining Algorithms for Association Rules and Clustering," Handbook of Parallel Computing: Models, Algorithms and Applications, Published 2006 by CRC Press, LLC, 25 pages. http://users.eecs.northwestern.edu/~yingliu/papers/para_arm_cluster.pdf.

Wang et al., A Parallel Association—Rule Mining Algorithm, International Conference on Web Information Systems and Mining WISM 2012: Web Information Systems and Mining, 2 pages. https://link.springer.com/chapter/10.1007/978-3-642-33469-6_18.

Han et al., Mining Frequent Patterns without Candidate Generation, SIGMOD '00 Proceedings of the 2000 ACM SIGMOD International Conference on Management of Data, Dallas, Texas, May 15-18, 2000, pp. 1-12.

Gondal et al., "Mining Associated Patterns from Wireless Sensor Networks," IEEE Transactions on Computers, vol. 64, No. 7, Jul. 2015, pp. 1998-2011.

Li et al., "PFP: Parallel FP-Growth for Query Recommendation," Proceedings of the 2008 ACM Conference on Recommender Systems, Lausanne, Switzerland, Oct. 23-25, 2008, pp. 107-114.

Pei, "Pattern-Growth Methods for Frequent Pattern Mining," Thesis Submitted for the Degree of Doctor of Philosophy in the School of Computing Science, Jun. 13, 2002, 165 pages.

Krupali et al., "Survey on the Techniques of FP-Growth Tree for Efficient Frequent Item-set Mining," International Journal of Computer Applications, vol. 160, No. 1, Feb. 2017, pp. 39-43.

Ramakrishnan, "CS 6604: Data Mining," Lecture 5, Monday, Sep. 3, 2007, Scribe: Andrew Hall, 6 pages.

* cited by examiner

ASSOCIATION RULE MINING SYSTEM

BACKGROUND

1. Field

The disclosure relates generally to an improved computer system and more specifically to method, apparatus, computer system, and computer program product for association rule mining

2. Description of the Related Art

When a customer uses online stores on the Internet, the customer often has a list of items to purchase. Each customer can have an individual list, depending on the needs and preferences of the customer. Online stores can provide recommendations to the customers based on information collected about the prior purchases, items viewed, and other information about the customers. Information about items purchased by the customers online can be identified for use in making recommendations. For example, items frequently purchased together by a customer can be determined. Subsequent purchases made after the purchased of a particular item or group of items can also be identified.

The information can be processed using association rule mining. Association rule mining is a rule-base machine learning method for discovering interesting relations between variables in large datasets. For example, with the purchasing of items, association rule mining can be used to uncover how items are associated to each other.

Currently used association rule mining techniques employ a two-part process in which frequent item discovery and rule generation are performed. With respect to frequent item discovery, one popular method is frequent pattern growth (FP growth). With this technique, large number patterns can be identified from each branch of a frequent pattern tree (FP tree). In turn, each pattern can result in the identification of many rules. As the branch is of the tree become deeper, the number of rules generated become extremely large. As a result, memory usage in computer systems can be an issue. Further, the amount of time needed to find a frequency of each part of the rules is extremely time-consuming.

Parallel frequent pattern (PFP) growth is one technique used for frequent item set mining in a distributed environment. This technique involves parallel item discovery. The paralyzing discovery can be performed through generating multiple conditional FP trees. With this technique, redundant data in multiple trees is present and the updating of these trees is time-consuming. Further, the memory used by this technique is also very large.

Therefore, it would be desirable to have a method and apparatus that take into account at least some of the issues discussed above, as well as other possible issues. For example, it would be desirable to have a method and apparatus that overcome a technical problem with identifying relations between various variables in a data set in a manner that decreases resource usage and processing time.

SUMMARY

According to one embodiment of the present invention, a method identifies relations between items in transactions. Local conditional frequency pattern trees are generated, by a computer system, in processing nodes in the computer system. The nodes in the local conditional frequency pattern trees represent items and a frequency of the items in the transactions. Global conditional frequency pattern trees are generated, by the computer system, in the processing nodes. Each processing node in the processing nodes generates a global conditional frequency pattern tree using a set of local conditional frequency pattern trees in the processing node. The global conditional frequency pattern trees generated by the processing nodes are distributed, by the computer system, such that each processing node in the processing nodes has the global conditional frequency pattern trees generated by other processing nodes. Patterns are generated by the computer system. A set of rules is generated, by the computer system, using the patterns and the global conditional frequency pattern trees in the processing nodes, wherein the set of rules define the relations between the items.

According to another embodiment of the present invention, a data mining system comprises a computer system that generates local conditional frequency pattern trees in processing nodes in the computer system. The nodes in the local conditional frequency pattern trees represent items and a frequency of the items in transactions. The computer system generates global conditional frequency pattern trees in the processing nodes. Each processing node in the processing nodes generates a global conditional frequency pattern tree using a set of local conditional frequency pattern trees in the processing node. The computer system distributes the global conditional frequency pattern trees generated by the processing nodes such that each processing node in the processing nodes has the global conditional frequency pattern trees generated by other processing nodes. The computer system generates patterns and generates a set of rules using the patterns and the global conditional frequency pattern trees in the processing nodes, wherein the set of rules define relations between the items.

According to yet another embodiment of the present invention, a computer program product for identifying relations between items in transactions comprises a computer-readable-storage media, first program code, second program code, third program code, fourth program code, and fifth program code stored on the computer-readable storage media. The first program code is run to generate conditional frequency pattern trees in processing nodes in a computer system, wherein nodes in the conditional frequency pattern trees represent items and a frequency of the items in the transactions. The second program code is run to generate global conditional frequency pattern trees in the processing nodes, wherein each processing node in the processing nodes generates a global conditional frequency pattern tree using a set of local conditional frequency pattern trees in the processing node. The third program code is run to distribute the global conditional frequency pattern trees generated by the processing nodes such that each processing node in the processing nodes has the global conditional frequency pattern trees generated by other processing nodes. The fourth program code is run to generate patterns. The fifth program code is run to generate a set of rules using the patterns and the global conditional frequency pattern trees in the processing nodes, wherein the set of rules define the relations between the items.

DETAILED DESCRIPTION

Figure 1:
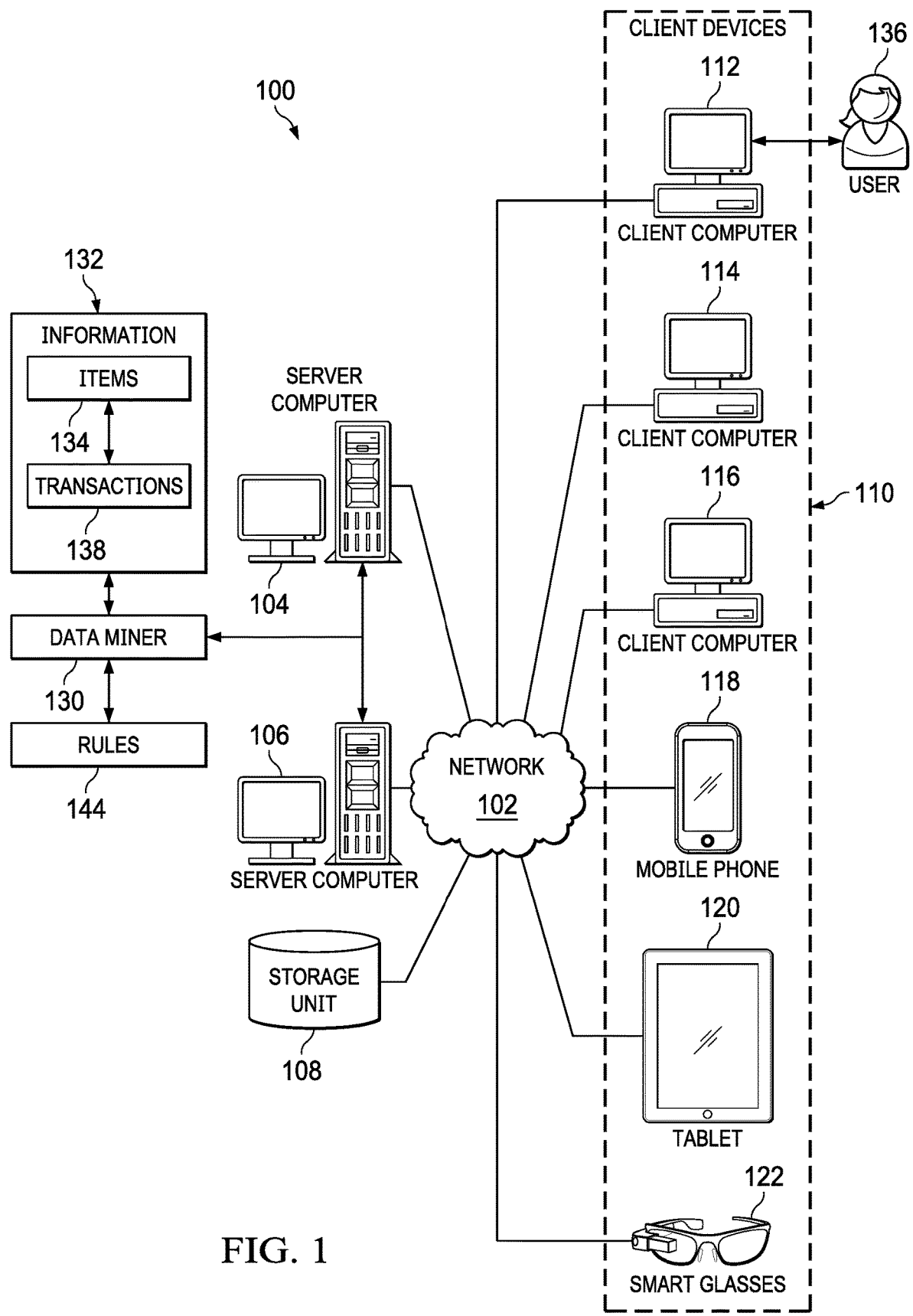
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that parallel frequent pattern growth (PFP) has several issues. For example, the illustrative embodiments recognize and take into account that processing time is extraordinarily when dividing data into conditional frequency pattern trees. The illustrative embodiments recognize and take into account that memory use and computational cost is be expensive prohibitively, especially when the dataset size is huge in frequent item discovery.

The illustrative embodiments recognize and take into account that dividing data into groups and updating multiple conditional frequency pattern trees can be more time consuming than desired. For example, the illustrative embodiments recognize and take into account that a transaction can be divided into multiple records such that data redundancy is present. The illustrative embodiments recognize and take into account this redundancy involves updating more multiple conditional frequency pattern trees with a single transaction. As result, this updating is more time consuming than desired.

The illustrative embodiments recognize and take into account that having a processing node store all of the conditional frequency pattern trees in memory can consume more memory than desired. The illustrative embodiments recognize and take into account that this situation can lead to memory overflow and application crashes.

The illustrative embodiments also recognize and take in account that rule generation using PFP can be an issue with respect to pattern searching in a distributed environment with large patterns. The illustrative embodiments recognize and take into account that the size of the patterns can result in storing the patterns on different partitions. The illustrative embodiments recognize and take account with large global patterns, having data in different locations can result in slower than desired searching.

Thus, the illustrative embodiments provide a method, apparatus, system, and computer program product for identifying relations between items in transactions. In one illustrative example, a method identifies relations between items in transactions. Local conditional frequency pattern trees are generated, by a computer system, in processing nodes in the computer system. The nodes in the local conditional frequency pattern trees represent items and a frequency of the items in the transactions. Global conditional frequency pattern trees are generated, by the computer system, in the processing nodes. Each processing node in the processing nodes generates a global conditional frequency pattern tree using a set of local conditional frequency pattern trees in the processing node. The global conditional frequency pattern trees generated by the processing nodes are distributed, by the computer system, such that each processing node in the processing nodes has the global conditional frequency pattern trees generated by other processing nodes. Patterns are generated by the computer system. A set of rules is generated, by the computer system, using the patterns and the global conditional frequency pattern trees in the processing nodes, wherein the set of rules define the relations between the items.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, data miner 130 can process information 132 to identify relationships between items 134 in information 132. As depicted in this illustrative example, information 132 can be collected from activities of users using clients 110. For example, user 136 can use client computer 112 to purchase items 134 online. Data miner 130 can receive transactions 138 for items 134 purchased by user 136. Data miner 130 can use data association rule mining in the form of parallel association rule (PAR) process to identify relationships between items 134 in information 132 and generate rules 144. In this example, rules 144 are association rules.

Data miner 130 can be distributed on multiple data processing systems. Each of these data processing systems is a processing node and the processing nodes on which data miner 130 is distributed are part of a cluster. In this example, data miner 130 runs on server computer 104 and server computer 106. Each of these server computers is a processing node and these two processing nodes form a cluster.

As depicted, data miner 130 uses a parallel association rule (PAR) process to generate a local frequency pattern tree (FP-Tree) in each node to compress information 132 based on ordered frequent items. Local conditional frequency pattern trees can be created for a local frequency pattern tree and distributed into the cluster. For example, server computer 104 generates a global frequency pattern tree from the local conditional frequency pattern trees generated from the local frequency pattern tree on server computer 104. Server computer 106 generates a global conditional frequency pattern tree from the local conditional frequency pattern trees generated from the local frequency pattern tree on server computer 106. Each of these server computers broadcast the global conditional frequency pattern tree generated. As a result, server computer 104 has the global conditional frequency pattern tree that server computer 104 generated and the global conditional frequency pattern tree that server computer 106 generated. In similar fashion, server computer 106 also has both global conditional frequency pattern trees.

Next, data miner 130 can aggregate the local conditional frequency pattern trees by conditional items to generate a global conditional frequency pattern tree. The global conditional frequency pattern tree is broadcast to each node in the cluster. As depicted, data miner 130 can generate a local pattern tree from the corresponding conditional frequency pattern tree on each processing node. Data miner 130 can generate rules 144 with the local pattern tree and the global conditional frequency pattern trees on each processing node, the server computers, in parallel.

As depicted, mining information 132 in the form of transactions about items 134 purchased by user 136 can result in rules 144 used to recommend items 134 to user 136. For example, rules 144 can be used to recommend selected items based on the current item that user 136 is viewing on client computer 112.

In this example, the parallel association rule (PAR) process used in data miner 130 is a two staged rule searching process, which can reduce the communication cost in the cluster and more quickly find the target patterns as compared to current processes used in association rule mining. This two-stage searching process provides a more efficient mechanism for searching for patterns and generating rules. In the illustrative example, data miner 130 uses the local pattern tree and the global conditional frequency pattern trees to search for patterns in generating rules. The search is performed first using the pattern tree. If the pattern is not round on the pattern tree, a search is performed using the global conditional frequency pattern trees.

The illustration of this implementation of association data mining used by data miner 130 using a parallel association rule (PAR) process is provided as one illustrative example and is not meant to limit the manner in which data miner 130 can implemented in other examples. For example, data miner 130 can be located on just server computer 104 or server computer 106. In other examples, data miner 130 can be located on server computers, work stations, or other data processing systems in addition to or in place of server computer 104 and server computer 106. In other words, the number of processing nodes and the type of processing nodes can vary in different illustrative examples.

Figure 2:
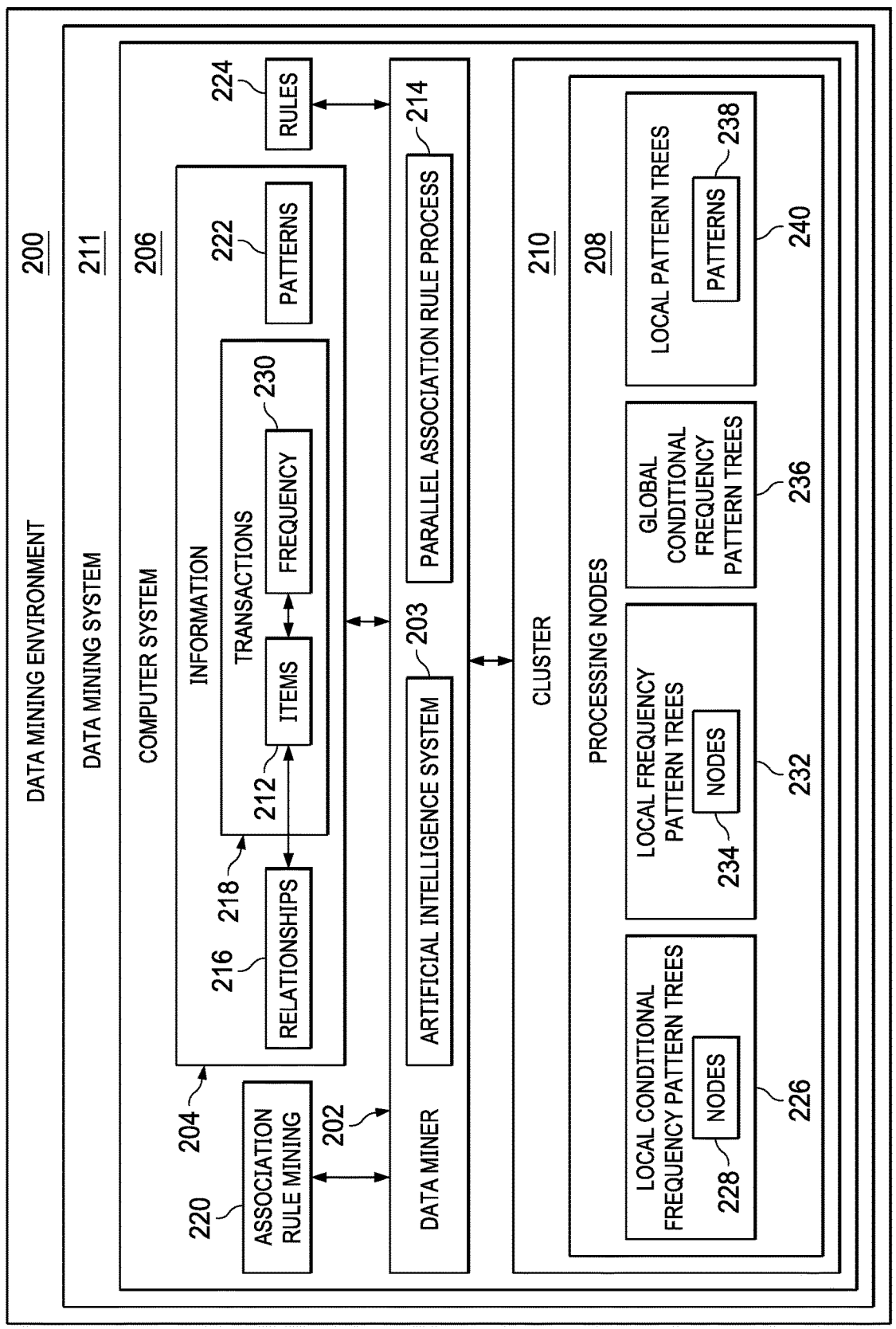
FIG. 2 is a block diagram of a data mining environment in accordance with an illustrative embodiment.

With reference now to FIG. 2, a block diagram of a data mining environment is depicted in accordance with an illustrative embodiment. In this illustrative example, data mining environment 200 includes components that can be implemented in hardware such as the hardware shown in network data processing system 100 in FIG. 1.

In this example, data mining environment 200 is an environment in which data miner 202 can run to process information 204. This processing of information 204 is also referred to as data mining. Data miner 202 runs on computer system 206. Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

In this illustrative example, data miner 202 can be distributed on multiple data processing systems in computer system 206. These data processing systems on which data miner 202 is located are processing nodes 208 that form cluster 210. As depicted, data miner 202 can process information 204 in parallel in the illustrative example. In this example, computer system 206 with data miner 202 and processing nodes 208 in cluster 210 form data mining system 211. In this illustrative example, information 204 can be partitioned and distributed to processing nodes 208 for parallel processing.

As depicted, data miner 202 can be implemented in software, hardware, firmware or a combination thereof. When software is used, the operations performed by data miner 202 can be implemented in program code configured to run on hardware, such as a processor unit. When firmware is used, the operations performed by data miner 202 can be implemented in program code and data and stored in persistent memory to run on a processor unit. When hardware is employed, the hardware may include circuits that operate to perform the operations in data miner 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

With using hardware, software, or some combination thereof, data miner 202 can be implemented using an artificial intelligence system 203. Artificial intelligence system 203 is a system that has intelligent behavior and can be based on function of the human brain. An artificial intelligence system comprises at least one of an artificial neural network, cognitive system, a Bayesian network, fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system.

As depicted, data miner 202 can process information 204 to identify relationships 216 between items 212 in information 204. In identifying relationships 216, data miner 202 can perform association rule mining 220 to identify patterns 222 in information 204. Additionally, data miner 202 can identify frequency items 212 and their associations. These associations are rules 224 and can also be referred to as association rules.

In this illustrative example, data miner 202 implements machine-based learning in artificial intelligence system 203 in which data mining is performed using parallel association rule process 214. This process overcomes issues with memory usage, processing time, and processor resources as encountered by other association rule processes such as parallel frequent pattern growth (PFP).

In one illustrative example, data miner 202 identifies relationships 216 between items 212 in transactions 218. Items 212 and transactions 218 can take a number of different forms. For example, transactions 218 can be online purchases of items 212 and wherein a set of rules 224 can be generated from the analysis for recommending items 212 to customers.

In another illustrative example, items 212 can be goods, services, amino acids, stocks, currency, nodes in a network, or other suitable types of items. Transactions can be, for example, without limitation, online purchases of the items, instore purchases of the items, purchases of goods, purchases of services, placement of amino acids, purchases of stocks, and purchases of currency purchases of goods, purchases of services, placement of amino acids, purchases of stock, purchases of concurrency, or other suitable types of transactions. In another example, the items can be sensor data. The sensor data can be used to determine whether an issue is present with sensors one of the components in a sensor system. Yet another illustrative example, the items can be positions determined using global positioning system devices in vehicles. This data can be used to determine when a particular type of traffic event may occur for the vehicles.

As depicted, data miner 202 in computer system 206 can be distributed within processing nodes 208 in cluster 210. In other words, processes and functions for data miner 202 can be located on processing nodes 208 in a manner that enables parallel processing of information 204.

In one illustrative example, data miner 202 running on computer system 206 generates local conditional frequency pattern trees 226 in processing nodes 208 in computer system 206. Nodes 228 in the local conditional frequency pattern trees 226 represent items 212 and frequency 230 of items 212 in transactions 218. The generation of local conditional frequency pattern trees 226 can be formed using currently available techniques generating these types of trees.

Data miner 202 can generate local conditional frequency pattern trees 226 in processing nodes 208 in computer system 206 on demand. In other words, a local conditional frequency pattern tree can be generated in a processing node when the conditional frequency pattern trees are needed. All possible local conditional frequency pattern trees do not need to be generated at the same time.

In this illustrative example, local conditional frequency pattern trees 226 can be generated using currently available techniques in association rule mining for generating frequency pattern trees from transactions for items. These techniques include those for frequent item set mining include, for example, an FP Growth Algorithm. These currently available techniques also referred to these types of trees as FP-trees.

In this illustrative example, in generating local conditional frequency pattern trees 226, data miner 202 generates local frequency pattern trees 232 in processing nodes 208 in computer system 206. Nodes 234 in the local frequency pattern trees 232 represent items 212 and frequency 230 of items 212 in transactions 218. In this illustrative example, local frequency pattern trees 232 can be generated using currently available techniques in association rule mining such as an FP Growth Algorithm. These currently available techniques also referred to these types of trees as FP-trees.

Data miner 202 generates local conditional frequency pattern trees 226 in processing nodes 208 in computer system 206 using corresponding local frequency pattern trees 232 in processing nodes 208 in computer system 206. Local conditional frequency pattern trees 226 can be generated on demand.

As depicted, data miner 202 can generate global conditional frequency pattern trees 236 in processing nodes 208.

Each processing node in processing nodes 208 generates a global conditional frequency pattern tree using a set of local conditional frequency pattern trees 226 in a processing node.

Data miner 202 distributes global conditional frequency pattern trees 236 generated by processing nodes 208 such that each processing node in processing nodes 208 has all of global conditional frequency pattern trees 236 generated by processing nodes 208. The distribution can be performed in a number of different ways. For example, the global conditional frequency pattern trees 236 can be broadcast to processing nodes 208 in cluster 210. For example, each processing node can broadcast the global conditional frequency pattern tree generated by that processing node to the other processing nodes in processing nodes 208.

In this illustrative example, data miner 202 can generate patterns 238. Patterns 238 are patterns of items. These patterns may indicate an order in which items are purchased, used, or otherwise manipulated. Data miner 202 generates a set of rules 224 using patterns 238 in local pattern trees 240 and global conditional frequency pattern trees 236 in processing nodes 208. The set of rules 224 define relationships 216 between items 212.

Patterns 238 can be handled in a more efficient manner as compared to current techniques. For example, in generating patterns 238, data miner 202 can place patterns 238 identified using the global conditional frequency pattern trees 236 into local pattern trees 240 in the processing nodes 208 in which patterns 238 are in local pattern trees 240. In other words, local pattern trees 240 are the data structure in which patterns 238 are stored. This type of storage of patterns 222 is more efficient than currently used techniques. For example, local pattern trees 240 use less memory and provide for faster searching as compared to currently used techniques.

In generating the set of rules 224, data miner 202 can generate the set of rules 224 using the local pattern trees 240 and global conditional frequency pattern trees 236 in processing nodes 208. In the illustrative example, local pattern trees 240 are extended dictionary trees that store patterns 238.

Figure 3:
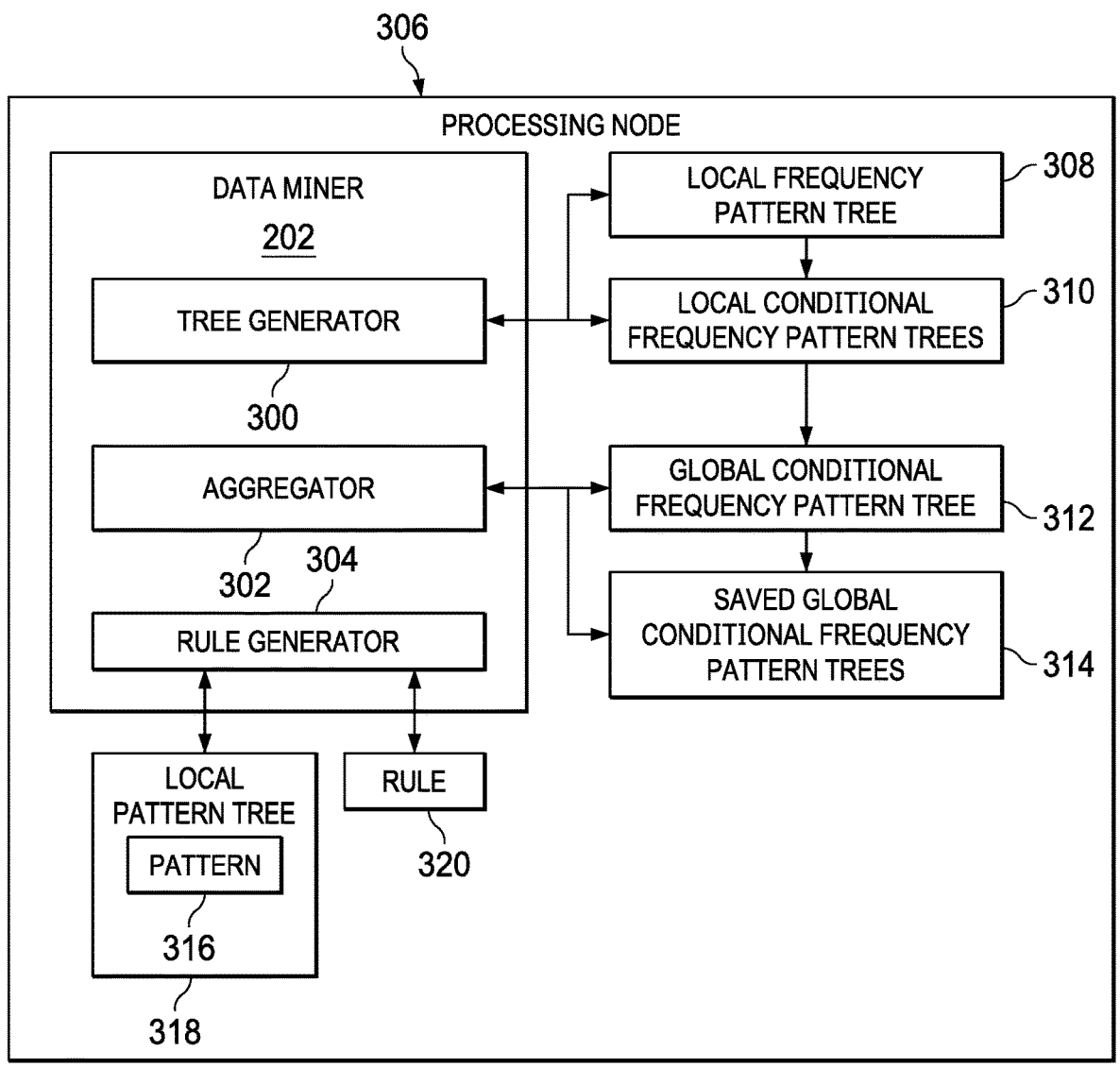
FIG. 3 is a block diagram of components for a data miner in accordance with an illustrative embodiment.

With reference to FIG. 3, a block diagram of components for a data miner is depicted in accordance with an illustrative embodiment. In the illustrative examples, the same reference numeral may be used in more than one figure. This reuse of a reference numeral in different figures represents the same element in the different figures.

FIG. 3 shows one manner in which data miner 202 can be implemented. As depicted in this example, data miner 202 includes tree generator 300, aggregator 302, and rule generator 304. These components implement processes for using parallel association rule process 214 in data miner 202. These components for data miner 202 are located in processing node 306 in which processing node 306 is an example of an implementation for processing nodes 208 in cluster 210 in FIG. 2. In other words, each processing node in a cluster can include these instances of these components to such that parallel processing can be performed by data miner 202.

In the illustrative example, tree generator 300 uses transactions in the records to generate local frequency pattern tree 308 in processing node 306. Each record used once and tree generator 300 avoids using the same record multiple times. The local frequency pattern tree 308 is then used by tree generator 300 to create local conditional frequency pattern trees 310 in the processing node 306.

In this illustrative example, local conditional frequency pattern trees 310 are created on demand. In other words, tree generator 300 does not create all of the possible local conditional frequency pattern trees. Instead, tree generator 300 creates a local conditional frequency pattern tree in response to request from aggregator 302.

Aggregator 302 aggregates the local conditional frequency pattern trees 310 in processing node 306 to form global conditional frequency pattern tree 312 in processing node 306. As depicted, processing node 306 can be assigned a set of items for processing. For an assigned item, global conditional frequency pattern tree 312 will aggregate all of the local conditional frequency pattern trees for the item as part of a process for generating global conditional frequency pattern tree 312.

Aggregator 302 sends a request to tree generator 300 for local conditional frequency pattern trees 310 for the items assigned to processing node 306. In this illustrative example, aggregator 302 can send a request for each item to tree generator 300 with those requests being received and processed in parallel by tree generator 300.

Aggregator 302 receives the local conditional frequency pattern trees for the items. Aggregator 302 aggregates local conditional frequency pattern trees 310 received from tree generator 300 for the items assigned to processing node 306. Thus, tree generator 300 does not need to generate every possible local conditional frequency pattern tree from the local frequency pattern tree 308 at the same time or store every local conditional frequency pattern tree generated. A local conditional frequency pattern tree generated for using in generating global conditional frequency pattern tree 312 can be discarded after being aggregated into the global conditional frequency pattern tree 312.

In this illustrative example, aggregator 302 also broadcasts or otherwise makes global conditional frequency pattern tree 312 available to other processing nodes in the cluster. Further, aggregator 302 can also save global conditional frequency pattern trees 314 broadcast by other processing nodes in processing node 306 to form saved global conditional frequency pattern trees 314.

As depicted, rule generator 304 identifies pattern 316 using global conditional frequency pattern tree 312 and saved global conditional frequency pattern trees 314. Pattern 316 is stored in local pattern tree 318 in processing node 306.

In the illustrative example, rule generator 304 uses local pattern tree 318 and the global conditional frequency pattern trees (global conditional frequency pattern tree 312 and saved global conditional frequency pattern trees 314), to generate rule 320. The generation of rule 320 can be performed by rule generator 304 in processing node 306 without using network connections or needing communications with other processing nodes.

In one illustrative example, one or more technical solutions are present that overcome a technical problem with identifying relations between various variables in a data set in a manner that decreases resource usage and processing time. As a result, one or more technical solutions may provide a technical effect reducing memory usage and the time needed to search patterns. One or more illustrative examples, provide one or more technical solutions in which local conditional frequency pattern trees are created as needed and storing all of the local conditional frequency pattern trees in a processing node is not required. One or more illustrative examples, provide one or more technical solutions in which patterns are stored in pattern trees reducing or eliminating a need for using partitions having a technical effect or reducing memory usage and processing time. For example, with reduced memory usage computing the confidence of rules take less time as compared to current systems that have such large patterns that the patterns are dividing into partitions.

Computer system 206 can be configured to perform at least one of the steps, operations, or actions described in the different illustrative examples using software, hardware, firmware or a combination thereof. As a result, computer system 206 operates as a special purpose computer system in which data miner 202 in computer system 206 enables identifying relationships between items. In particular, data miner 202 transforms computer system 206 into a special purpose computer system as compared to currently available general computer systems that do not have data miner 202.

In the illustrative example, the use of data miner 202 in computer system 206 integrates processes into a practical application for method identifying relations between items in transactions that increases the performance of computer system 206 in identifying the relations. In other words, data miner 202 in computer system 206 is directed to a practical application of processes integrated into data miner 202 in computer system 206 that generates a local frequency pattern trees in a processing node and generates local conditional frequency pattern trees in a processing node on demand such that all of the local conditional frequency pattern trees are not stored in the processing node, reducing memory usage. The processes integrated into data miner 202 in computer system 206 generate a global conditional frequency pattern tree in a processing node by aggregating the conditional frequency pattern trees, which are created as needed for aggregation into the global conditional frequency pattern tree. The processes integrated into data miner 202 in computer system 206 distribute the global conditional frequency pattern trees generated by the processing nodes such that each processing node in the processing nodes has all of the global conditional frequency pattern trees generated by the processing nodes.

The use of global conditional frequency pattern trees also reduces memory usage. The processes integrated into data miner 202 in computer system 206 generate pattern trees that contain patterns for the items reducing memory usage as compared to current systems. In this illustrative example, data miner 202 in computer system 206 integrate these steps in a practical application of data mining that results in improvement in reducing resource usage and reducing processing time to identify relationships between items and to generate rules about those relationships. In this manner, data miner 202 in computer system 206 provides a practical application of identifying relations between items in transactions such that the functioning of computer system 206 is improved.

The illustration of data mining environment in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

The data mining and generation of rules 224 can be used for other purposes in addition to or in place of recommending items to users. For example, data mining can be used to discover how items purchased by customers in a store are associated with each other. With the generation for rules for these associations, the rules can be used to place items next to each other so that customers buy more items.

Association rule mining using parallel association rule process 214 in the illustrative examples can be applied to many different applications in addition to or in place of online marketing of goods and services. These other applications can include, for example, intrusion detection, continuous production, network traffic analysis, vehicle traffic routing, malware detection, medical diagnosis. As yet another example, information about the sequence of amino acids in proteins can be used to develop rules to synthesize artificial proteins with desired functionality using parallel association rule process 214. In yet another illustrative example, parallel association rule process 214 described in the illustrative examples can be used to generate rules that identify sign or symptoms and a diagnosis of a condition. In other words, association rule mining as implemented in the illustrative examples can be used to generate rules as to the probability of the occurrence of diseases.

In still other illustrative examples, rules 224 do not need to be generated after identifying patterns 238 in local pattern trees 240 and global conditional frequency pattern trees 236 for items 212. Patterns 238 can be useful for performing other steps or actions without requiring rules 224.

Figure 4:
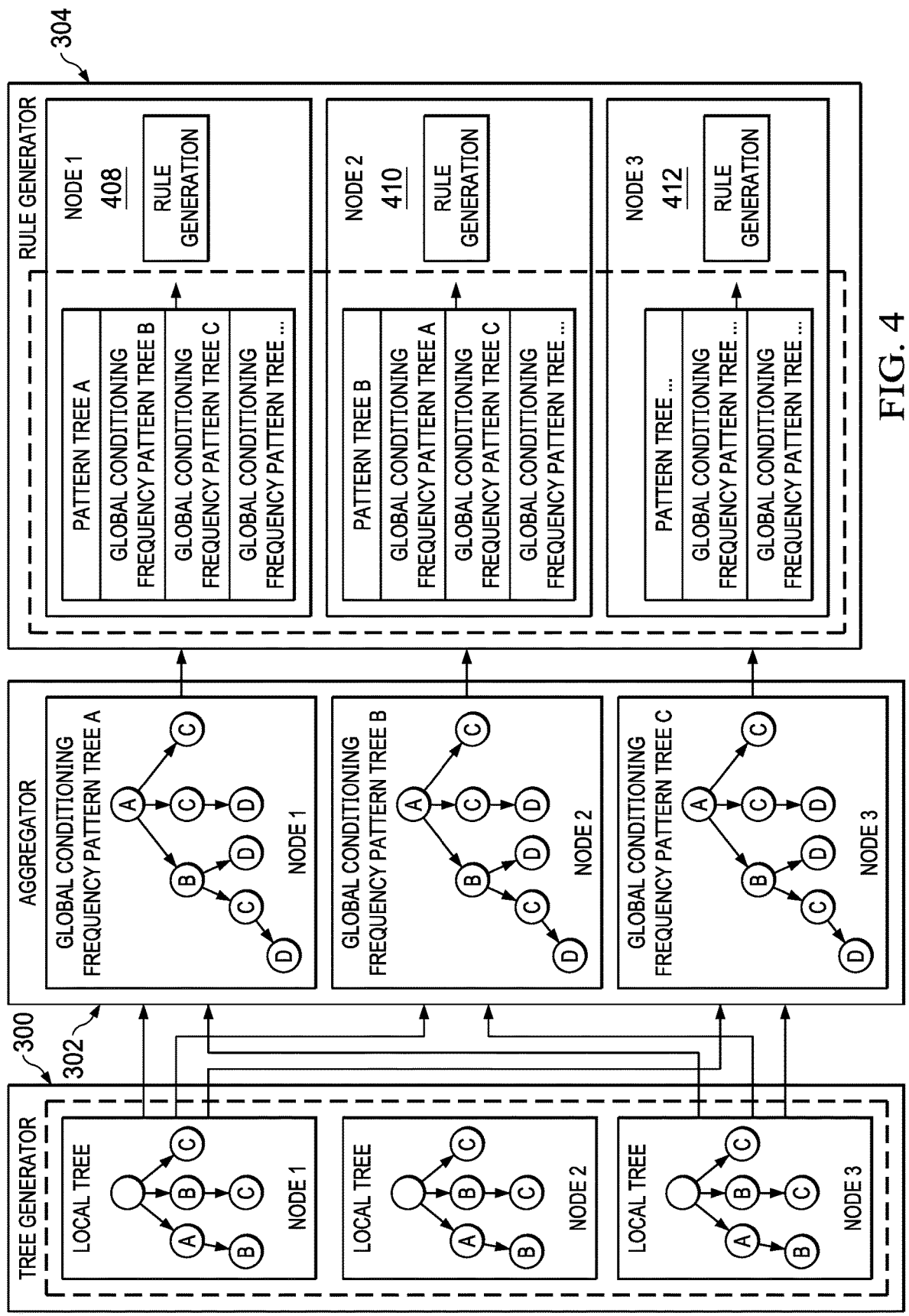
FIG. 4 is a dataflow diagram illustrating steps performed in parallel association rule mining by components in a data miner in accordance with an illustrative embodiment.

Turning to FIG. 4, a dataflow diagram illustrating steps performed in parallel association rule mining by components in a data miner is depicted in accordance with an illustrative embodiment. In this illustrative example, components in a data miner in processing transactions for items stored in records are shown. In this example, tree generator 300, aggregator 302, in rule generator 304 can perform steps using parallel association rule process 214 in FIG. 2. These components can be distributed across different processing nodes. These components can be located in processing node 408, processing node 410, and processing node 412. Three processing nodes are depicted for a cluster for purposes of illustration. Other numbers of processing nodes can be used in other illustrative examples. For example, 5 processing nodes, 200 processing nodes, 3000 processing nodes, or some other number of processing nodes can be used in other examples.

As depicted, tree generator 300 in data miner 202 creates ordered frequent items. Ordered frequent items are items in transactions that have been placed in descending order based on the support for each item. In other words, the items in each transaction are placed in descending order such that the first item has the highest support and the last item has the lowest support. The ordered frequent items can also be filtered to keep items that have support that is equal to or above a threshold value.

Tree generator 300 generates a local frequency pattern tree in each of the three processing nodes. The use of the local frequency pattern tree compresses the data in the transaction and is created using the ordered frequent items. Further, the use of the local frequency pattern tree increases the efficiency in generating local conditional frequency pattern trees by aggregator 302 in performing parallel processing in the processing nodes. Tree generator 300 also generates local conditional frequency pattern trees in the processing nodes.

These local conditional frequency pattern trees are created as on demand. In other words, the local conditional frequency pattern trees are creates as needed. The conditional frequency pattern trees can be generated on demand without saving all the conditional frequency pattern trees in a processing node at the same time. This reduces or avoid a crash of an application because of memory usage.

Aggregator 302 generates global conditional frequency pattern trees that are created by aggregating local conditional frequency pattern trees. In aggregator 302, a local conditional frequency pattern tree is created as local conditional frequency pattern tree is needed for aggregation into the global conditional frequency pattern tree. After the local conditional frequency pattern tree is placed into the global conditional frequency pattern tree, the local conditional frequency pattern tree can be discarded and the memory freed for other uses. In this example, aggregator 302 can implement a FP-tree merge processes based on Hadoop key-value aggregation.

The global conditional frequency pattern trees in the processing nodes are broadcasted by aggregator 302. The broadcasting allows each processing node to have a copy of the global conditional frequency pattern trees generated by the other processing nodes.

Rule generator 304 generates a local pattern tree in each processing node from the corresponding global conditional frequency pattern tree created by the processing node. Rule generator 304 arranges the local pattern tree and global conditional frequency processing trees in each processing to form a cascading storage structure. The local pattern tree used in this example is a more efficient structure for search for patterns as compared to current techniques.

These data structures can use rule generator 304 to realize high-speed query to search for patterns in the pattern tree. For patterns that are not found this local pattern tree, the information can be obtained from the global conditional frequency pattern trees. This cascading searching is performed by searching a local pattern tree and then searching global conditional frequency pattern trees, if needed, can solve the problem of data explosion and data partition in pattern searching encountered by current techniques. This feature reduces the communication cost within a cluster and enable more quickly locating target patterns as compare to current techniques of managing patterns.

Rule generator 304 in each processing node generates a rule using the local pattern tree and the global conditional frequency processing trees in the processing node. The use of the local pattern tree to search for information is more efficient as compared to the current practice of storing patterns in partitions. The global conditional frequency pattern trees include the global conditional frequency pattern tree generated by the node, and the other global conditional frequency processing trees obtained from global conditional frequency processing trees being broadcast by the processing nodes. In this example, the process to generate the rules is performed in parallel.

In data flow in the steps illustrated in FIG. 4, a local frequency pattern tree is present in a processing node and local conditional frequency pattern trees are generated as needed by the processing node. This process avoids simultaneous updates of split data and multiple trees, improving the efficiency of conditional tree generation. This process reduces data redundancy and reduces processing time.

Further, each node stores all of the global conditional frequency pattern trees for use in pattern search for rule generation. These take up less memory than the global patterns. Each processing node generates a pattern tree using the global conditional pattern tree generated by the processing node. This pattern tree and the global conditional frequency pattern trees from the processing nodes are used in a two-stage searching process for pattern searching and rule generation, reducing data redundancy and data explosion present with current techniques such as FP Growth.

Figures 5, 6:
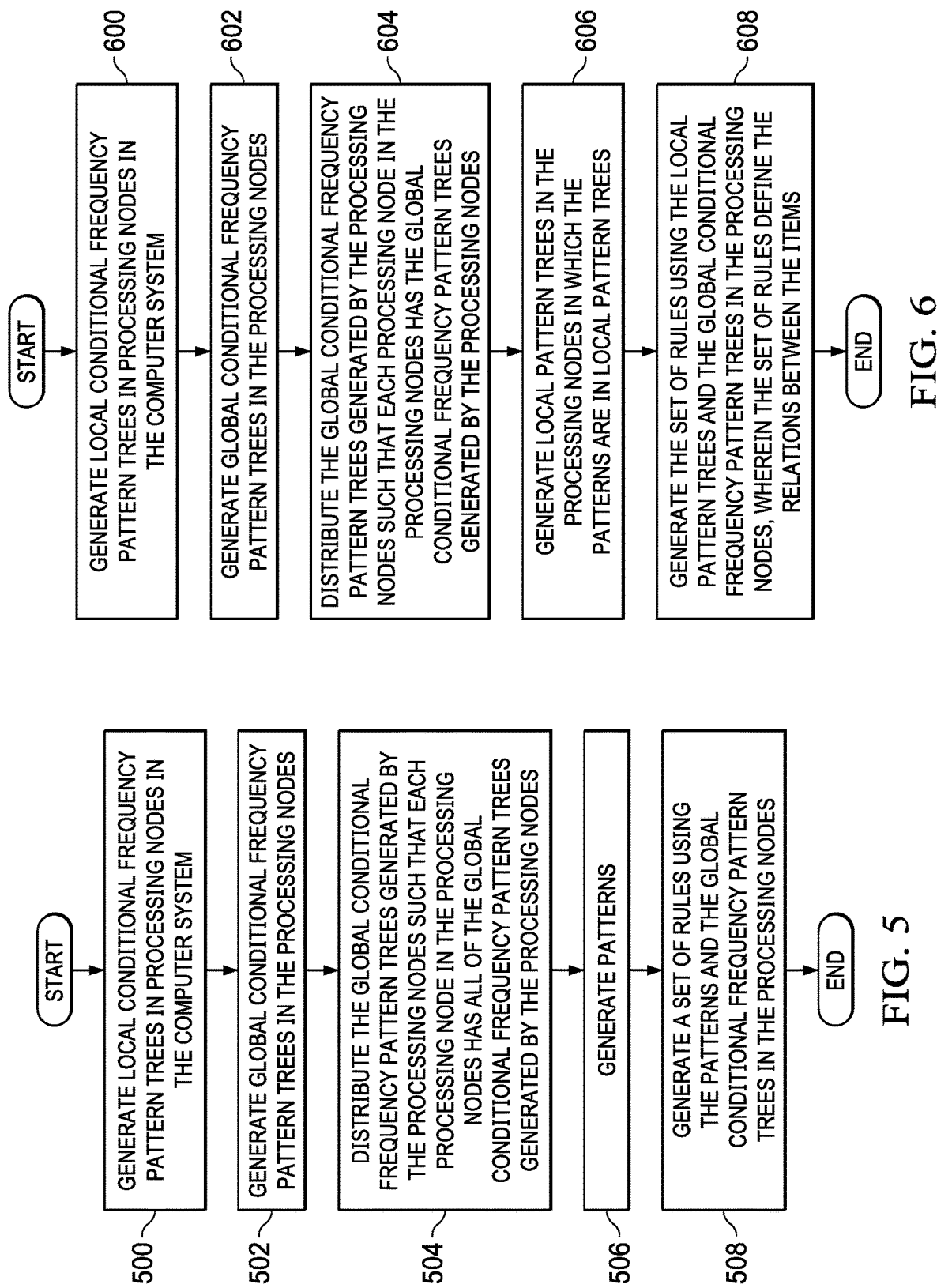
FIG. 5 is a flowchart of a process for identifying relations between items in transactions in accordance with an illustrative embodiment.
FIG. 6 is a flowchart of a process for identifying relations between items in transactions in accordance with an illustrative embodiment.

Turning next to FIG. 5, a flowchart of a process for identifying relations between items in transactions is depicted in accordance with an illustrative embodiment. The process in FIG. 5 can be implemented in hardware, software, or both. When implemented in software, the process can take the form of program code that is run by one of more processor units located in one or more hardware devices, in one or more computer systems. For example, the process can be implemented in data miner 202 in computer system 206 in FIG. 2.

The process begins by generating local conditional frequency pattern trees in processing nodes in the computer system (step 500). The nodes in the local conditional frequency pattern trees represent items and a frequency of the items in the transactions. The process generates global conditional frequency pattern trees in the processing nodes (step 502). In step 502, each processing node in the processing nodes generates a global conditional frequency pattern tree using a set of local conditional frequency pattern trees in the processing node.

The process distributes the global conditional frequency pattern trees generated by the processing nodes such that each processing node in the processing nodes has all of the global conditional frequency pattern trees generated by the processing nodes (step 504). A result of step 504 is that each processing node has all of the global conditional frequency pattern trees generated by the processing nodes.

The process generates patterns (step 506). The process generates a set of rules using the patterns and the global conditional frequency pattern trees in the processing nodes (step 508). The process terminates thereafter. The set of rules define the relations between the items.

With reference to FIG. 6, a flowchart of a process for identifying relations between items in transactions is depicted in accordance with an illustrative embodiment. The process in FIG. 6 can be implemented in hardware, software, or both. When implemented in software, the process can take the form of program code that is run by one of more processor units located in one or more hardware devices in one or 1 more computer systems. For example, the process can be implemented in data miner 202 in computer system 206 in FIG. 2. This process includes a local pattern tree and does not need to use a global pattern as currently used by other association rule mining techniques.

The process begins by generating local conditional frequency pattern trees in processing nodes in the computer system (step 600). The nodes in the local conditional frequency pattern trees represent items and a frequency of the items in the transactions.

The process generates global conditional frequency pattern trees in the processing nodes (step 602). The process distributes the global conditional frequency pattern trees generated by the processing nodes such that each processing node in the processing nodes has the global conditional frequency pattern trees generated by the processing nodes (step 604).

The process generates local pattern trees in the processing nodes in which the patterns are in local pattern trees (step 606). In this illustrative example, each processing node has a local pattern tree that is generated from the global conditional pattern frequency tree that the processing node generated from the local conditional pattern frequency trees. The generation of local pattern trees can be performed in parallel in the different processing nodes.

The process generates the set of rules using the local pattern trees and the global conditional frequency pattern trees in the processing nodes, wherein the set of rules define the relations between the items (step 608). The generation of the rules in step 608 can be performed in parallel in the different processing nodes. The process terminates thereafter.

In step 608, a processing node can use the local pattern tree generated from the global conditional frequency pattern tree that the processing node created. Further, if needed, the processing node can also access the saved global conditional frequency pattern trees obtained from other processing nodes broadcasting their global conditional frequency pattern trees. In this manner, the patterns and rule generation and the information needed for rule generation are combined into a single node for parallel processing.

Figure 7:
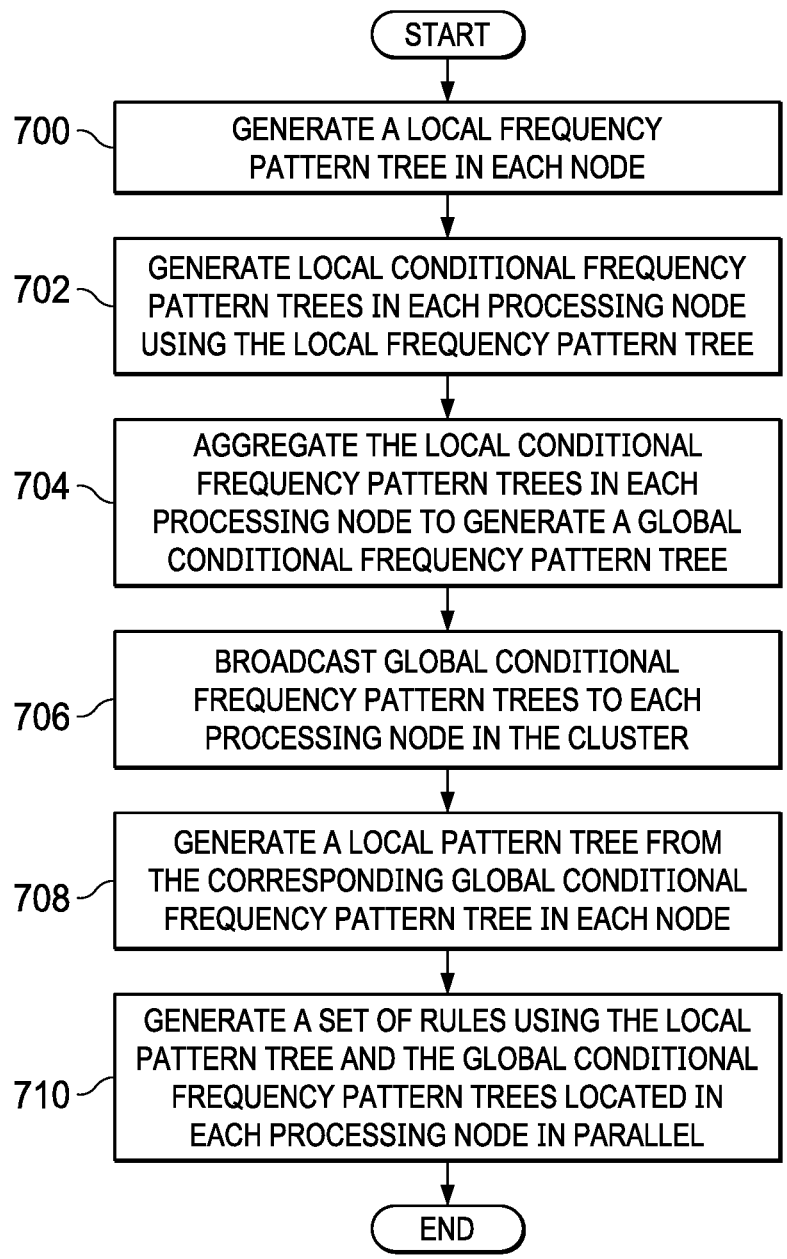
FIG. 7 is a more detailed flowchart of a process for identifying relations between items in transactions in accordance with an illustrative embodiment.

With reference to FIG. 7, a more detailed flowchart of a process for identifying relations between items in transactions is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in data miner 202 in computer system 206 in FIG. 2.

The process begins by generating a local frequency pattern tree in each node (step 700). The use of the local frequency pattern tree compresses transaction data. The local frequency pattern tree stores items in nodes with a frequency of the items and the nodes are connected to each other based on the pattern of transactions in which the items are used.

The process generates local conditional frequency pattern trees in each processing node using the local frequency pattern tree (step 702). For example, a processing node generates local conditional frequency pattern trees from the local frequency pattern tree in the node.

The process aggregates the local conditional frequency pattern trees in each processing node to generate a global conditional frequency pattern tree (step 704). In step 704, each processing node generates a conditional frequency pattern tree from the local conditional frequency pattern trees in the processing node. The process broadcasts global conditional frequency pattern trees to each processing node in the cluster (step 706). In this manner, each processing node has a copy of all the global conditional frequency pattern trees stored locally in the processing node.

The process generates a local pattern tree from the corresponding global conditional frequency pattern tree in each node (step 708). In this illustrative example, the local pattern trees can be generated directly from the global conditional frequency pattern tree. In other examples, patterns can be derived from the global conditional frequency pattern tree with those patterns being used to generate local pattern tree.

The process generates a set of rules using the local pattern tree and the global conditional frequency pattern trees located in each processing node in parallel (step 710). The process terminates thereafter.

Figure 8:
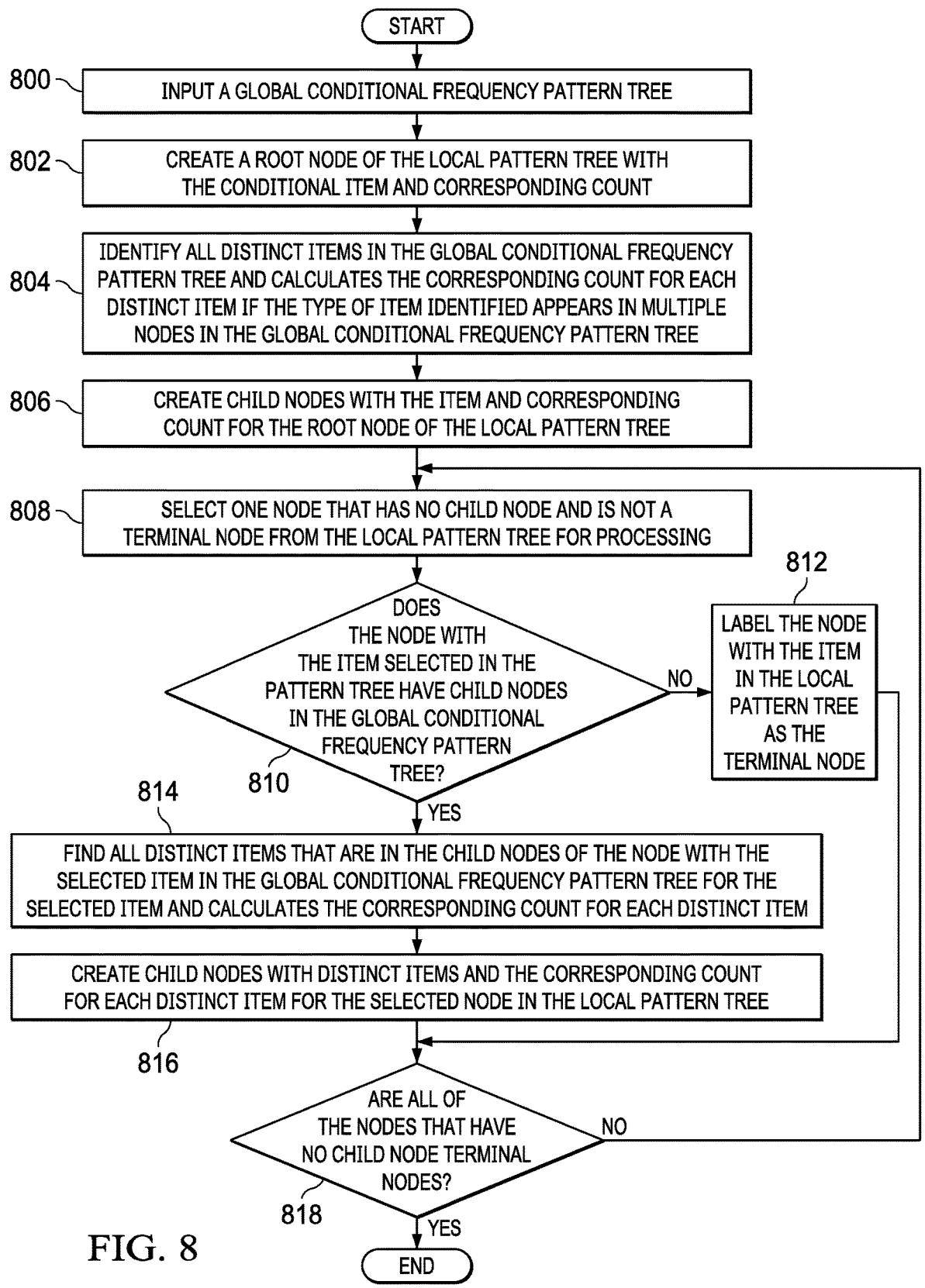
FIG. 8 is a flowchart of a process for generating a pattern tree from a global conditional frequency pattern tree in accordance with an illustrative embodiment.

With reference now to FIG. 8, a flowchart of a process for generating a pattern tree from a global conditional frequency pattern tree is depicted in accordance with an illustrative embodiment. The process in FIG. 8 can be implemented in hardware, software, or both. When implemented in software, the process can take the form of program code that is run by one of more processor units located in one or more hardware devices in one or 1 more computer systems. For example, the process can be implemented in data miner 202 in computer system 206 in FIG. 2. For example, the process can be implemented by rule generator 304 in data miner 202 in FIG. 3 to generate pattern trees such as local pattern trees for the processing nodes. This process is an example of one implementation step 706 in FIG. 7.

The process begins by inputting a global conditional frequency pattern tree (step 800). This global conditional frequency pattern tree is the one generated by processing nodes that is generated the pattern tree. The process creates a root node of the local pattern tree with the conditional item and corresponding count (step 802). In this illustrative example, a conditional item is an item of interest for which patterns of items in transactions that include the item of interest are be identified.

The process then identifies all distinct items in the global conditional frequency pattern tree and calculates the corresponding count for each distinct item if the type of item identified appears in multiple nodes in the global conditional frequency pattern tree (step 804). For example, items f, c, and a are three distinct items that can be present in many nodes and may be present in a global conditional pattern tree. In other words, the same item may appear in more than one node. For example, two nodes f:3 and f:2 may both have f as the type of item. One has a count of three while the other node has a count or two. As result, f is a type of item with a count of five. In this case f is a distinct item with a count of five.

The process then creates child nodes with the item and corresponding count for the root node of the local pattern tree (step 806). The process selects one node that has no child node and is not a terminal node from the local pattern tree for processing (step 808).

A determination is made as to whether the node with the item selected in pattern tree has child nodes in the global conditional frequency pattern tree (step 810). If the node with the item selected in the pattern tree has child nodes in the global conditional frequency pattern tree, the process finds all distinct items that are in the child nodes of the node with the selected item in the global conditional frequency pattern tree for the selected item and calculates the corresponding count for each distinct item (step 814).

The process then creates child nodes with distinct items and the corresponding count for each distinct item for the selected node in the local pattern tree (step 816). A determination is made as to whether all of the nodes that have no child node are terminal nodes (step 818). If not all of the nodes that have no child nodes are terminal nodes, the process then returns to step 808. Otherwise, the process terminates if all of the nodes that have no child nodes are terminal nodes.

With reference again to step 810, if the node with the item in the current pattern tree does not have child nodes in the global conditional frequency pattern tree, the process labels the node with the item in the local pattern tree as the terminal node (step 812). In this illustrative tentative example, terminal node is a leaf node from which a child node cannot be added to the leaf node. The process then proceeds to step 818. With reference again to step 818, if all of the nodes that have no child nodes are terminal nodes, the process terminates.

Figure 9:
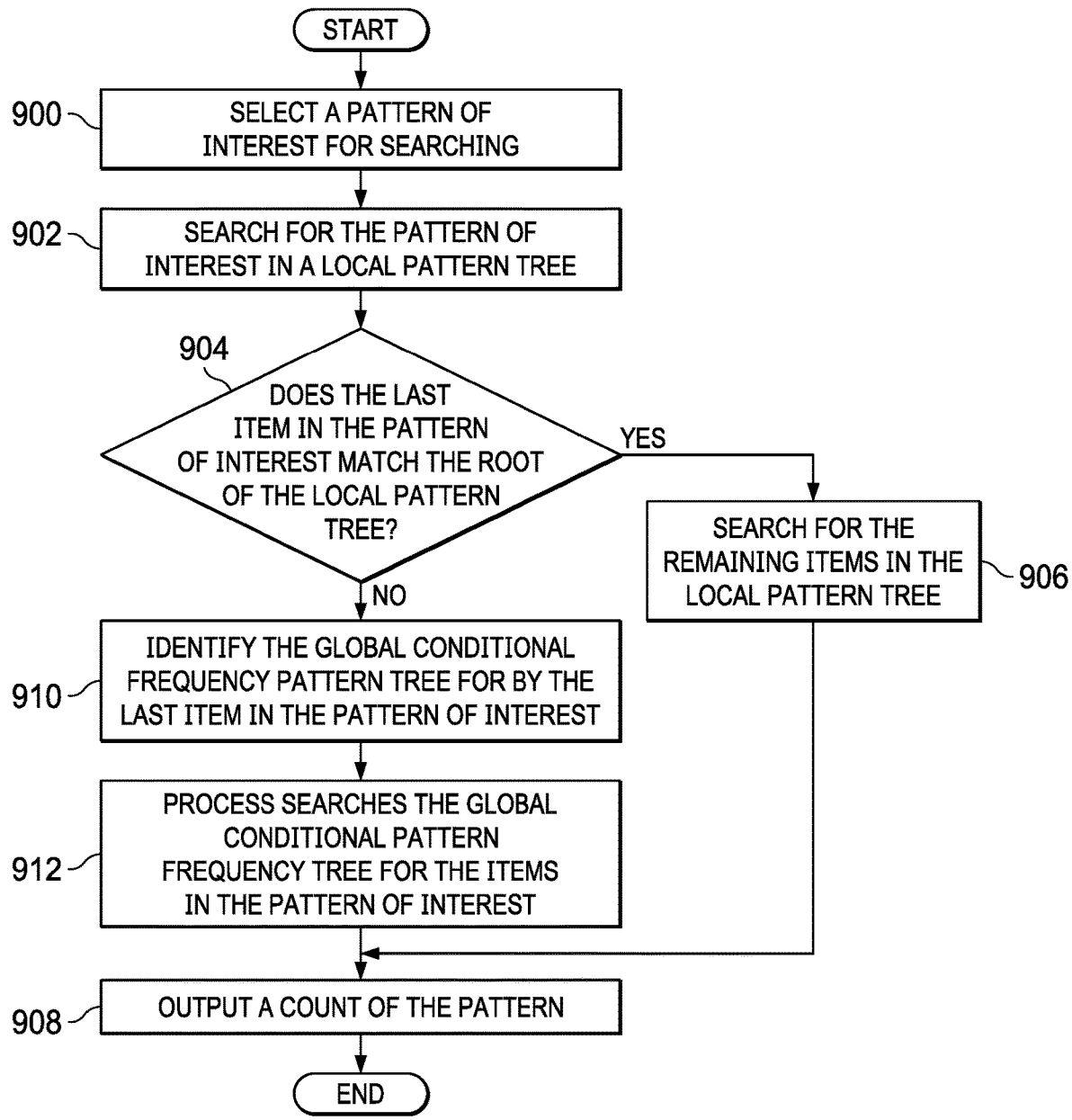
FIG. 9 is a flowchart of a process for a cascade search in accordance with an illustrative embodiment.

With reference next to FIG. 9, a flowchart of a process for a cascade search is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in data miner 202 in computer system 206 in FIG. 3. For example, the process can be implemented by rule generator 304 in data miner 202 in a processing node to search for patterns to generate a rule.

The beings by selecting a pattern of interest for searching (step 900). The pattern searches for the pattern of interest in a local pattern tree (step 902). This searching is a first searching stage.

A determination is made as to whether the last item in the pattern of interest matches the root of the local pattern tree (step 904). For example, in step 904, the pattern of items can be f,a,e. In step 904, the process determines whether item "e" is in the root the local pattern tree.

If the last item in the pattern of interest matches the root of the local pattern tree, the process searches for the remaining items in the local pattern tree (step 906). With the example pattern of f,a,e, if item "e" is in the root, the process then searches to see if the first item (searching is from head to tail) in the pattern, item "f", is in a node below the root node. If item "f" is in a node below the root node, then a similar search is made for item "a".

The process outputs a count of the pattern (step 908). The process terminates thereafter, With reference again to step 904, if the last item in the pattern of interest does not match the root of the local pattern tree, the process identifies a global conditional frequency pattern tree by the last item in the pattern of interest (step 910). The process searches the global conditional pattern frequency tree for the items in the pattern of interest (step 912). The process then proceeds to step 908.

The searching performed in the process in FIG. 9 can be performed without needing connections or communications to other resources outside of the process. This searching can be performed in parallel, in which different processing nodes search for different patterns of interest.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
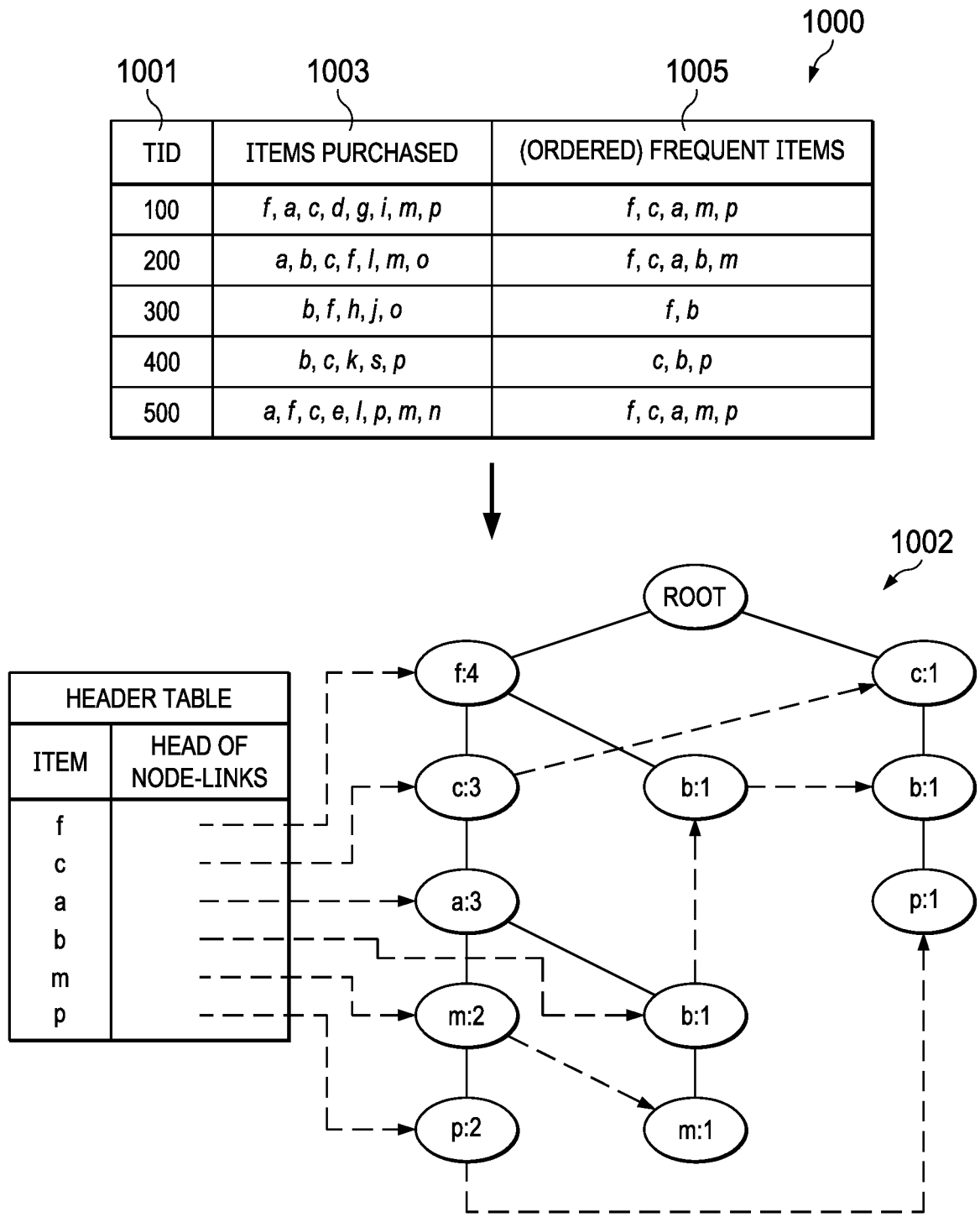
FIG. 10 is a diagram illustrating dataflow for generating a local conditional frequency pattern tree from transactions in accordance with an illustrative embodiment.

With reference next to FIG. 10, a diagram illustrating dataflow for generating a local conditional frequency pattern tree from transactions is depicted in accordance with an illustrative embodiment. The processing of data in this figure can be performed by data miner 202 in FIG. 2 and in particular using tree generator 300 for data miner 202 in FIG. 3.

As depicted in this figure, transactions for items are shown in transaction table 1000. As depicted, column 1001 contain transaction identifiers, column 1003 contains items purchased in a transaction, and column 1005 contains ordered frequent items. These items are in a frequency descending order. Column 1005 can be identified by finding the support for each item. The support is number of times the item is present in the transactions being processed such as those in transaction table 1000 divided by the total number of transactions. The support is a percentage and transactions below a threshold frequency can be removed through filtering. The remaining items are arranged in the order of descending support.

These transactions are used to generate local frequency pattern tree 1002. In this example, the local frequency pattern tree 1002 is an example of a tree that each processing node generates when transactions are assigned to those processing nodes. In other words, the local frequency pattern trees generated by the processing nodes are different from each other because these trees are generated from different transactions assigned to the particular processing nodes.

As can be seen, each node in local frequency pattern tree 1002 identifies an item and a count or frequency for the item. The nodes are linked to each other to reflect order of the transactions. In this illustrative example, the header table in local frequency pattern tree 1002 can be used to identify the head node of links for different items.

Figure 11:
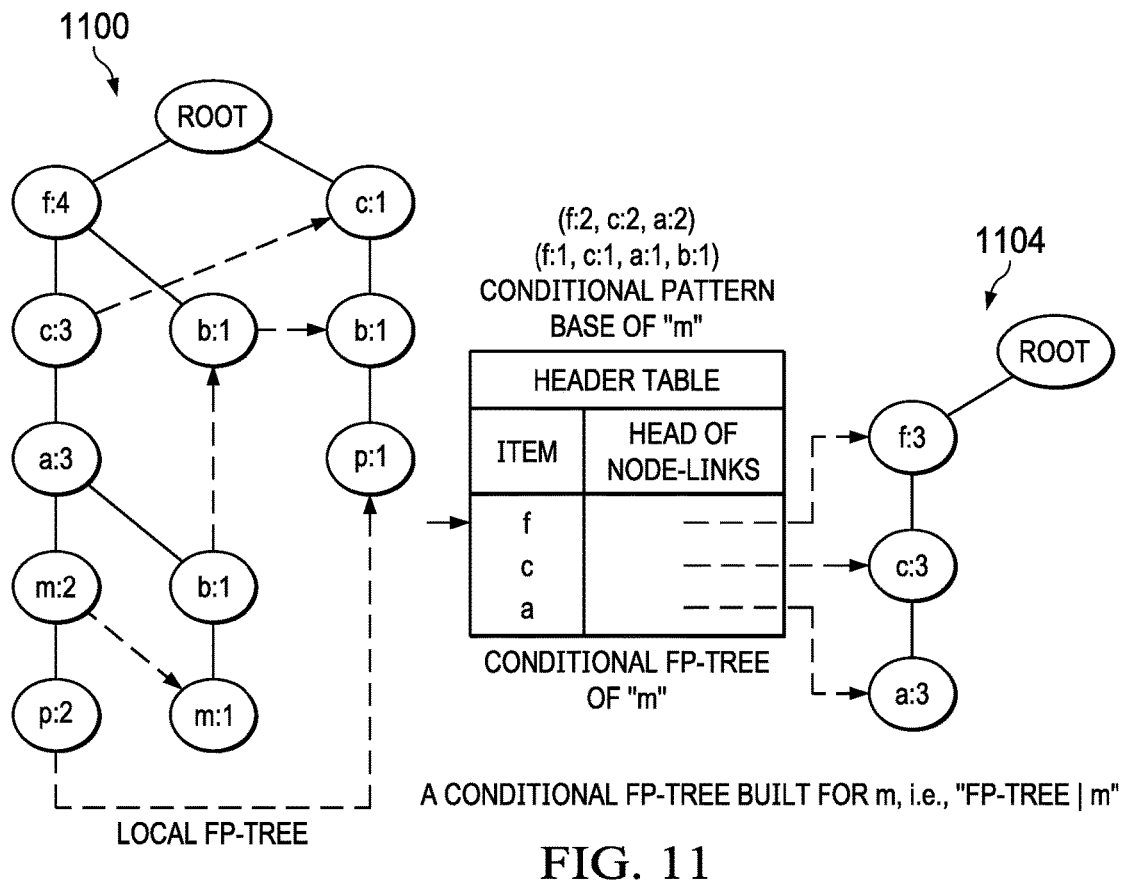
FIG. 11, is a diagram illustrating dataflow for generating local conditional pattern trees from a local frequency pattern tree in accordance with an illustrative embodiment.

Turning to FIG. 11, a diagram illustrating dataflow for generating local conditional pattern trees from a local frequency pattern tree is depicted in accordance with an illustrative embodiment. The processing of data in this figure can be performed by data miner 202 in FIG. 2 and in particular using rule generator 304 for data miner 202 in FIG. 3.

As depicted, local frequency pattern tree 1100 is used to generate local conditional frequency pattern tree 1104 which is generated from two branches of "m" (f:2,c:2,a:2) and (f1,c:1,a:1,b:1) present in the local frequency pattern tree 1100. In this example, a header table is illustrated for local conditional frequency pattern tree 1104. These branches of "m" are referred to as m's conditional pattern base. This local conditional frequency pattern tree is are constructed using this conditional pattern based on the local frequency pattern tree. In the illustrative example, these local conditional frequency pattern tree 1104 is generated when needed. In other words, all of the potential local conditional frequency trees are not generated and stored in a processing node.

Figure 12:
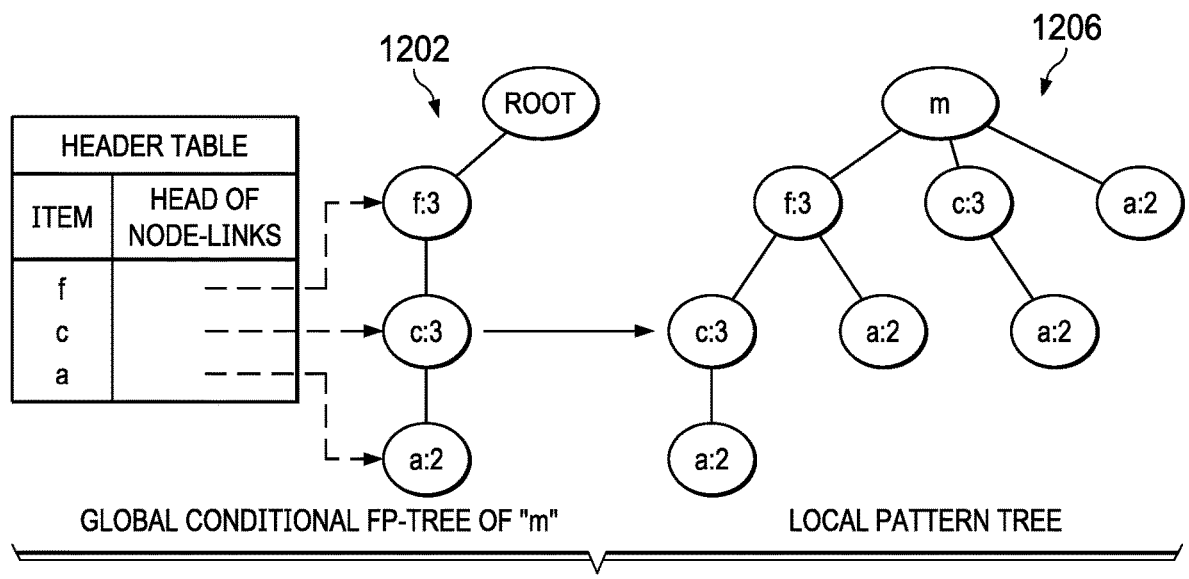
FIG. 12 is a diagram illustrating dataflow for generating a pattern tree from a global conditional frequency pattern tree in accordance with an illustrative embodiment.

With reference next to FIG. 12, a diagram illustrating dataflow for generating a pattern tree from a global conditional frequency pattern tree is depicted in accordance with an illustrative embodiment. The processing of data in this figure can be performed by data miner 202 in FIG. 2 and in particular using rule generator 304 for data miner 202 in FIG. 3.

In this illustrative example, global conditional frequency pattern tree 1202 for item "m" is depicted. The header table is part of global conditional frequency pattern tree 1202. Local pattern tree 1206 is a data structure that holds patterns generated using the header table 1200 and global conditional frequency pattern tree 1202. Pattern tree 1206 identifies patterns for items in global conditional frequency pattern tree 1202. Each node in pattern tree 1206 identifies the item and the counter for the item. This count is considered the frequency for a particular item. The generation of pattern tree 1206 is from the global conditional frequency pattern tree 1202.

Figure 13:
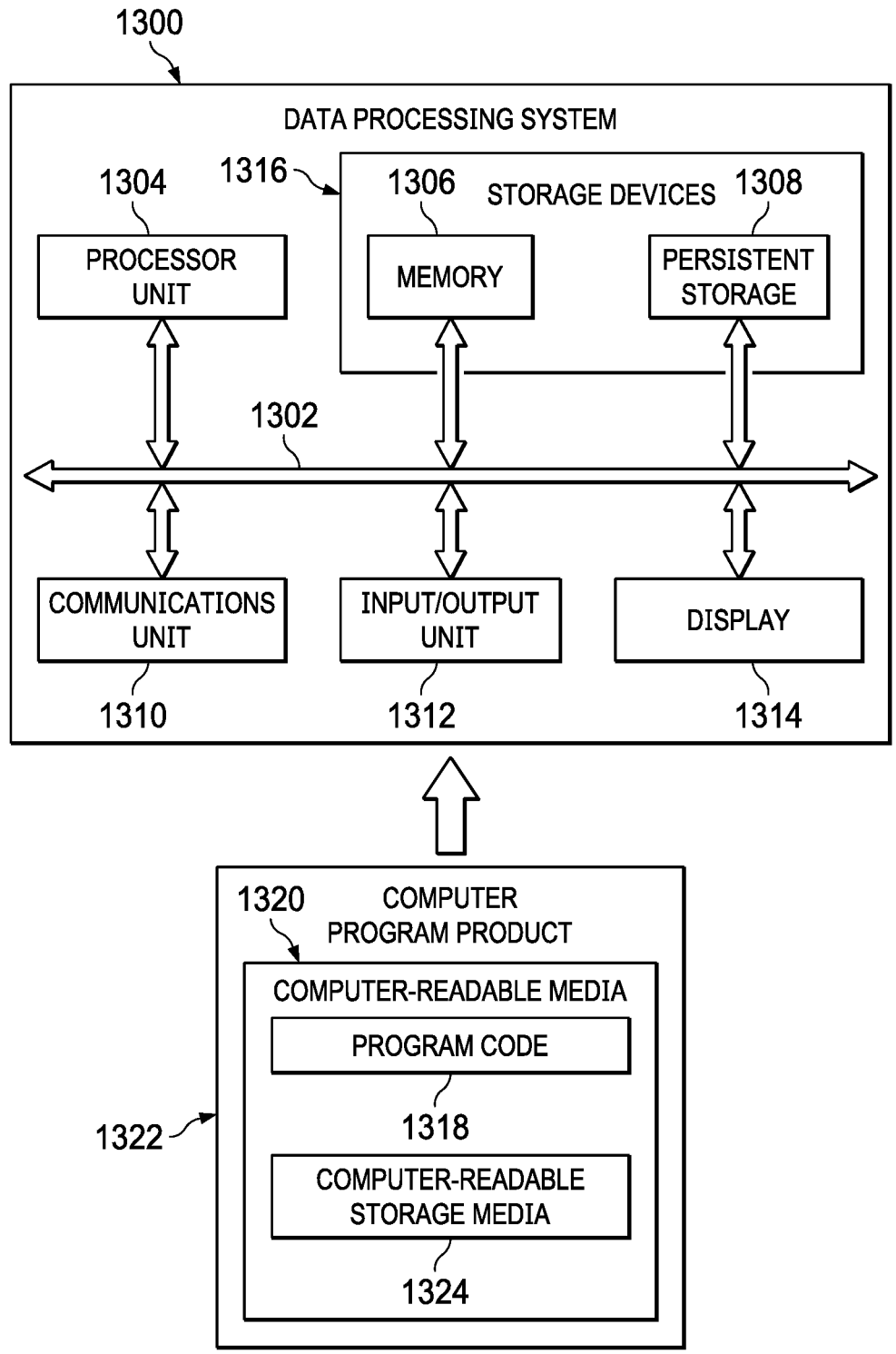
FIG. 13 is a block diagram of a data processing system in accordance with an illustrative embodiment.

Turning now to FIG. 13, a block diagram of a data processing system is depicted in accordance with an illustrative embodiment. Data processing system 1300 can be used to implement server computer 104, server computer 106, and client devices 110 in FIG. 1. Data processing system 1300 can also be used to implement computer system 206 including processing nodes 208 in cluster 210 in FIG. 2. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1304 can may be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are referred to as program code, computer usable program code, or computer-readable program code that can be read and executed by a processor in processor unit 1304. The program code in the different embodiments can be embodied on different physical or computer-readable storage media, such as memory 1306 or persistent storage 1308.

Program code 1318 is located in a functional form on computer-readable media 1320 that is selectively removable and can be loaded onto or transferred to data processing system 1300 for execution by processor unit 1304. Program code 1318 and computer-readable media 1320 form computer program product 1322 in these illustrative examples. In the illustrative example, computer-readable media 1320 is computer-readable storage media 1324.

In these illustrative examples, computer-readable storage media 1324 is a physical or tangible storage device used to store program code 1318 rather than a medium that propagates or transmits program code 1318.

Alternatively, program code 1318 can be transferred to data processing system 1300 using a computer-readable signal media. The computer-readable signal media can be, for example, a propagated data signal containing program code 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, may be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program code 1318.

Thus, illustrative embodiments of the present invention provide a computer implemented method, computer system, and computer program product for identifying relations between items in transactions. Local conditional frequency pattern trees are generated, by a computer system, in processing nodes in the computer system. The nodes in the local conditional frequency pattern trees represent items and a frequency of the items in the transactions. Global conditional frequency pattern trees are generated, by the computer system, in the processing nodes. Each processing node in the processing nodes generates a global conditional frequency pattern tree using a set of local conditional frequency pattern trees in the processing node. In some illustrative examples, a processing node may generate more than one global conditional frequency pattern tree when more than one conditional item is assigned to a processing node. The global conditional frequency pattern trees generated by the processing nodes are distributed, by the computer system, such that each processing node in the processing nodes has the global conditional frequency pattern trees generated by other processing nodes. Pattern trees are generated by the computer system. A set of rules is generated, by the computer system, using the pattern trees and the global conditional frequency pattern trees in the processing nodes, wherein the set of rules define the relations between the items.

In one or more illustrative examples, information is processed, pre-compressed local frequency pattern trees before generating the local conditional frequency pattern trees. This process increases performance in both memory usage and computational resource usage. Further, the illustrative examples employ cascade caches to store the pattern frequency and search the frequency on-demand, which avoid the normal process to search the frequency based on overall frequent item set collection.

Thus, the illustrative can use a pattern tree and global conditional pattern trees to combine patterns and rules generation in one processing node. With the user of a pattern tree and global conditional pattern trees in a processing node, a transfer of the huge patterns in the cluster is avoided and decrease the range of patterns searching occurs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for identifying relations between items in transactions, the method comprising:
   generating, by a computer system, local conditional frequency pattern trees in processing nodes in the computer system, wherein nodes in the local conditional frequency pattern trees represent items and a frequency of the items in the transactions;
   generating, by the computer system, global conditional frequency pattern trees in the processing nodes, wherein each processing node in the processing nodes generates a global conditional frequency pattern tree using a set of local conditional frequency pattern trees in the processing node;
   distributing, by the computer system, the global conditional frequency pattern trees generated by the processing nodes such that each processing node in the processing nodes has the global conditional frequency pattern trees generated by other processing nodes;
   generating, by the computer system, patterns; and
   generating, by the computer system, a set of rules using the patterns and the global conditional frequency pattern trees in the processing nodes, wherein the set of rules define the relations between the items.

2. The method of claim 1, wherein generating, by the computer system, the patterns comprises:
   generating, by the computer system, local pattern trees in the processing nodes using the global conditional frequency pattern trees in which the patterns are in the local pattern trees; and
   wherein generating, by the computer system, the set of rules using the patterns and the global conditional frequency pattern trees in the processing nodes, wherein the set of rules define the relations between the items comprises:
   generating, by the computer system, the set of rules using the local pattern trees and the global conditional frequency pattern trees in the processing nodes, wherein the set of rules define the relations between the items.

3. The method of claim 1, wherein generating, by the computer system, local conditional frequency pattern trees in processing nodes in the computer system comprises:
   generating, by the computer system, local conditional frequency pattern trees in processing nodes in the computer system on demand.

4. The method of claim 2, wherein each node in the nodes has a local pattern tree generated using the global conditional frequency pattern tree generated by the node.

5. The method of claim 2, wherein the local pattern trees are dictionary trees that stores the patterns.

6. The method of claim 1, wherein generating, by the computer system, the local conditional frequency pattern trees in the processing nodes in the computer system comprises:
   generating, by the computer system, local frequency pattern trees in the processing nodes in the computer system, wherein nodes in the local frequency pattern trees represent the items and a frequency of the items in the transactions; and
   generating, by the computer system, the local conditional frequency pattern trees in the processing nodes in the computer system using corresponding local frequency pattern trees in the processing nodes in the computer system.

7. The method of claim 1, wherein the transactions are online purchases of the items and wherein the set of rules is used to recommendation items to customers.

8. The method of claim 1, wherein the transactions are selected from a group comprising online purchases of the items, instore purchases of the items, purchases of goods, purchases of services, placement of amino acids, purchases of stocks, and purchases of currency.

9. A data mining system comprising:
   a computer system that generates local conditional frequency pattern trees in processing nodes in the computer system, wherein nodes in the local conditional frequency pattern trees represent items and a frequency of the items in transactions; generates global conditional frequency pattern trees in the processing nodes, wherein each processing node in the processing nodes generates a global conditional frequency pattern tree using a set of local conditional frequency pattern trees in the processing node; distributes the global conditional frequency pattern trees generated by the processing nodes such that each processing node in the processing nodes has the global conditional frequency pattern trees generated by other processing nodes; generates patterns; and generates a set of rules using the patterns and the global conditional frequency pattern trees in the processing nodes, wherein the set of rules define relations between the items.

10. The data mining system of claim 9, wherein in generating the patterns, the computer system generates local pattern trees in the processing nodes using the global conditional frequency pattern trees; and
   wherein in generating the set of rules using the patterns and the global conditional frequency pattern trees in the processing nodes, wherein the set of rules define the relations between the items, the computer system generates the set of rules using the local pattern trees and the global conditional frequency pattern trees in the processing nodes, wherein the set of rules define the relations between the items.

11. The data mining system of claim 9, wherein in generating local conditional frequency pattern trees in processing nodes in the computer system, the computer system generates local conditional frequency pattern trees in processing nodes in the computer system on demand.

12. The data mining system of claim 10 wherein each node in the nodes has a local pattern tree generated using the global conditional frequency pattern tree generated by the node.

13. The data mining system of claim 10, wherein the local pattern trees are dictionary trees that stores the patterns.

14. The data mining system of claim 9, wherein in generating the local conditional frequency pattern trees in the processing nodes in the computer system, the computer system generates local frequency pattern trees in the processing nodes in the computer system, wherein the nodes in the local frequency pattern trees represent the items and a frequency of the items in the transactions and wherein the computer system generates the local conditional frequency pattern trees in the processing nodes using corresponding local frequency pattern trees in the processing nodes.

15. The data mining system of claim 9, wherein the transactions are online purchases of the items and wherein the set of rules is for used to recommendation items to customers.

16. The data mining system of claim 9, wherein the transactions are selected from a group comprising online purchases of the items, and instore purchases of the items.

17. A computer program product for identifying relations between items in transactions, the computer program product comprising:
a non-transitory computer-readable storage media;
first program code, stored on the non-transitory computer-readable storage media, for generating conditional frequency pattern trees in processing nodes in a computer system, wherein nodes in the conditional frequency pattern trees represent items and a frequency of the items in the transactions;
second program code, stored on the non-transitory computer-readable storage media, for generating global conditional frequency pattern trees in the processing nodes, wherein each processing node in the processing nodes generates a global conditional frequency pattern tree using a set of local conditional frequency pattern trees in the processing node;
third program code, stored on the non-transitory computer-readable storage media, for distributing the global conditional frequency pattern trees generated by the processing nodes such that each processing node in the processing nodes has the global conditional frequency pattern trees generated by other processing nodes;
fourth program code, stored on the non-transitory computer-readable storage media, for generating patterns; and
fifth program code, stored on the non-transitory computer-readable storage media, for generating a set of rules using the patterns and the global conditional frequency pattern trees in the processing nodes, wherein the set of rules define the relations between the items.

18. The computer program product of claim 17, wherein the fourth program code comprises:
program code, stored on the non-transitory computer-readable storage media, for generating local pattern trees in the processing nodes using the global conditional frequency pattern trees; and
wherein the fifth program code comprises:
program code, stored on the non-transitory computer-readable storage media, for generating the set of rules using the local pattern trees and the global conditional frequency pattern trees in the processing nodes, wherein the set of rules define the relations between the items.

19. The computer program product of claim 17, wherein the first program code comprises:
program code, stored on the non-transitory computer-readable storage media, for generating local conditional frequency pattern trees in processing nodes in the computer system on demand.

20. The computer program product of claim 17 wherein the first program code comprises:
program code, stored on the non-transitory computer-readable storage media, for generating local frequency pattern trees in the processing nodes in the computer system, wherein nodes in the local frequency pattern trees represent the items and a frequency of the items in the transactions; and
program code, stored on the non-transitory computer-readable storage media, generating the set of local conditional frequency pattern trees in the processing nodes using corresponding local frequency pattern trees in the processing nodes.

\* \* \* \* \*